(12) United States Patent
Decius et al.

(10) Patent No.: US 11,440,545 B2
(45) Date of Patent: Sep. 13, 2022

(54) CONTROL SYSTEM FOR A MOTOR VEHICLE, MOTOR VEHICLE, METHOD FOR CONTROLLING A MOTOR VEHICLE, COMPUTER PROGRAM PRODUCT AND COMPUTER-READABLE MEDIUM

(71) Applicant: HELLA GMBH & CO. KGAA, Lippstadt (DE)

(72) Inventors: Nikolaus Decius, Lippstadt (DE); Ulrich Koehler, Lippstadt (DE); Carsten Kuegeler, Lippstadt (DE); Sergey Orlov, Paderborn (DE); Juergen Gebert, Moosburg (DE); Peter Grabs, Wuerzburg (DE); Matthias Korte, Wuerzburg (DE); Josua Blott, Karlsruhe (DE); Michael Claus, Schwalmstadt-Roershain (DE); Heiko Lerch, Ruelzheim (DE); Sebastian Ludolph, Lahntal (DE); Martin Ott, Kernen im Remstal (DE); Sebastian Surmund, Steinbach (DE); Pascal Vollmer, Karlsruhe (DE); Martin Zillgen, Koenigswinter (DE); Sven Hillenkoetter, Untereuerheim (DE); Martin Hopf, Strullendorf (DE); Joachim Oechsner, Reichenberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 212 days.

(21) Appl. No.: 16/846,955

(22) Filed: Apr. 13, 2020

(65) Prior Publication Data
US 2020/0238992 A1   Jul. 30, 2020

Related U.S. Application Data

(63) Continuation of application No. PCT/EP2018/076455, filed on Sep. 28, 2018.

(30) Foreign Application Priority Data

Oct. 12, 2017 (DE) ..................... 10 2017 218 271.7

(51) Int. Cl.
*B60W 30/18* (2012.01)
*B60W 10/08* (2006.01)
(Continued)

(52) U.S. Cl.
CPC ............ *B60W 30/18* (2013.01); *B60W 10/08* (2013.01); *B60W 10/18* (2013.01); *B60W 10/20* (2013.01);
(Continued)

(58) Field of Classification Search
CPC ...... B60W 30/18; B60W 10/08; B60W 10/18; B60W 10/20; B60W 50/0205;
(Continued)

(56) References Cited

U.S. PATENT DOCUMENTS 6,424,900 B2 * 7/2002 Murray ................. G05B 15/02
701/32.7
9,919,713 B2   3/2018 Sautter
(Continued)

FOREIGN PATENT DOCUMENTS

DE        101 12 514 A1    6/2002
DE   10 2006 062 300 A1   10/2008
(Continued)

*Primary Examiner* — Alan D Hutchinson
(74) *Attorney, Agent, or Firm* — Muncy, Geissler, Olds & Lowe, P.C.

(57) ABSTRACT

A control system for a motor vehicle having a first control unit for controlling a first function of the motor vehicle and a second control unit for controlling a second function of the motor vehicle. In order to ensure, with the least possible additional complexity, that functions of a motor vehicle that are controlled by means of control units are properly executed even in the event of a faulty control unit, the (Continued)

control system has a third control unit for controlling the first function and the second function of the motor vehicle and, depending on the receipt of a fault signal of the first and/or second control unit by the third control unit, the third control unit can be configured such that the motor vehicle first and/or second function corresponding to the faulty control unit can be controlled by means of the third control unit alone.

9 Claims, 1 Drawing Sheet

(51) Int. Cl.
*B60W 10/18* (2012.01)
*B60W 10/20* (2006.01)
*B60W 50/02* (2012.01)
*B60W 50/023* (2012.01)

(52) U.S. Cl.
CPC ...... *B60W 50/023* (2013.01); *B60W 50/0205* (2013.01); *B60W 2050/021* (2013.01)

(58) Field of Classification Search
CPC ......... B60W 50/023; B60W 2050/021; B60W 50/0098; B60W 2050/0006; B60T 8/88; B60T 8/321; B60T 2270/402; B60T 2270/413; B60T 8/885
See application file for complete search history.

(56) References Cited

U.S. PATENT DOCUMENTS 10,202,090 B2  2/2019  Arnold et al.
2007/0005203 A1  1/2007  Sundaram et al.

FOREIGN PATENT DOCUMENTS

| DE | 10 2015 214 521 A1 | 2/2017 |
| EP | 2 765 045 A1 | 8/2014 |
| FR | 2 843 341 B1 | 4/2005 |
| WO | WO 2011/032586 A1 | 3/2011 |

* cited by examiner

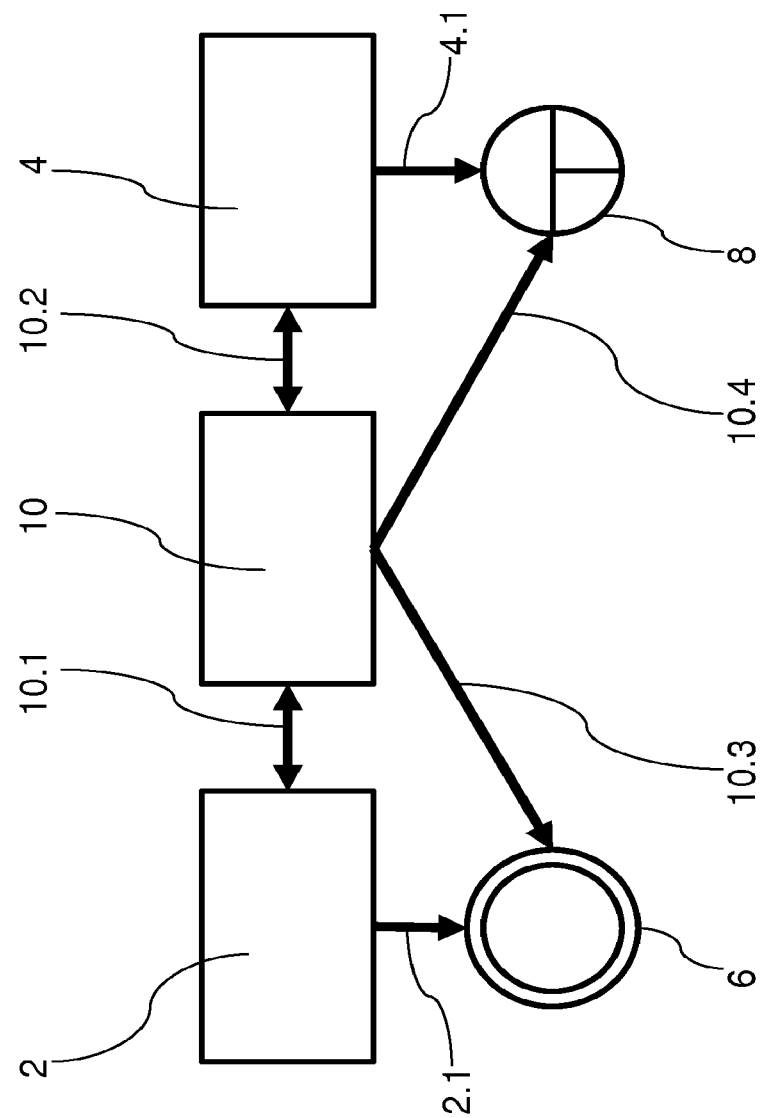

CONTROL SYSTEM FOR A MOTOR VEHICLE, MOTOR VEHICLE, METHOD FOR CONTROLLING A MOTOR VEHICLE, COMPUTER PROGRAM PRODUCT AND COMPUTER-READABLE MEDIUM

This nonprovisional application is a continuation of International Application No. PCT/EP2018/076455, which was filed on Sep. 28, 2018, and which claims priority to German Patent Application No. 10 2017 218 271.7, which was filed in Germany on Oct. 12, 2017, and which are both herein incorporated by reference.

BACKGROUND OF THE INVENTION

Field of the Invention

The present invention relates to a control system for a motor vehicle, to a motor vehicle, to a method for controlling a motor vehicle, to a computer program product, and to a computer-readable medium.

Description of the Background Art

Such control systems for motor vehicles, motor vehicles, methods for controlling motor vehicles, computer program products, and computer-readable media are already known in numerous variants from the state of the art.

For example, a control system for a motor vehicle is known from the machine translation of FR 2 843 341 B1 into English; it comprises a first control unit designed as a brake control unit for controlling a motor vehicle first function designed as a braking function, a second control unit designed as a steering control unit for controlling a motor vehicle second function designed as a steering function, and a reserve control unit designed as a central control unit, wherein the brake control unit and the steering control unit are each connected in a signal-transmitting manner to at least one sensor and/or to at least one actuator and wherein the brake control unit is connected in a signal-transmitting manner to the central control unit. In the event of a fault in the brake control unit, emergency braking is initiated and controlled by the central control unit.

SUMMARY OF THE INVENTION

It is therefore an object of the present invention to ensure the proper execution of motor vehicle functions, controlled by control units, even in the event of a faulty control unit with the least possible additional complexity.

An exemplary advantage of the invention is, in particular, that motor vehicle functions which are different from one another and controlled by means of control units can also be safely executed in the event of a fault in one of the control units with the least possible additional expenditure. In this case, at least two motor vehicle functions which are different from one another and are in each case controlled by a control unit continue to be executed in the event of a fault in one of the two control units, without having to make a reserve control unit or the like available for both control units. Accordingly, it is possible to save installation space and weight and to reduce costs. This is very important, especially in modern motor vehicles with a high degree of electrically and electronically designed functionality, therefore, a large number of functions controlled by control units.

The control system of the invention not only ensures the execution of a first function in the event of a faulty first control unit or the execution of a second function in the event of a faulty second control unit, at least in an emergency operation of the respective function, but also enables the execution of the first and second functions, at least in an emergency operation, with a simultaneously faulty first and faulty second control unit.

For example, it is conceivable that in a normal operation of the control system, the first function can be controlled jointly by means of the third control unit and the first control unit, and the second function of the motor vehicle can be jointly controlled by means of the third control unit and the second control unit. Accordingly, the third control unit would be used for executing the first and second functions of the motor vehicle not only in a faulty operation of the control system, in which the first and/or second control unit (does) do not function properly, but also in the normal operation of the control system in which all three control units function properly.

The first and second control units can each be connected in a signal-transmitting manner to the third control unit. Thus, instead of direct signal-transmitting connections, indirect signal-transmitting connections are also conceivable.

For example, an indirect signal-transmitting connection would also be understood to mean that, for example, in the event of a fault the first and/or second control unit forward an error message to a higher-level control unit by means of a signal-transmitting connection, and the higher-level control unit then generates a corresponding output signal and transmits it to the third control unit. The output signal of the higher-level control unit thus leads to a configuration of the third control unit such that the motor vehicle function corresponding to the faulty control unit can be controlled by means of the third control unit alone. The same applies to the method of the invention, according to which the third control unit alone controls the motor vehicle function corresponding to the faulty control unit depending on the output signal of the higher-level control unit. The higher-level control unit can be, for example, a central control unit.

According to the invention, the term "control unit" can be understood in general terms and denotes any type of electrical or electronic device for the automatic control of a function of a motor vehicle.

A particularly advantageous refinement of the control system of the invention provides that, depending on the receipt of a fault signal of the third control unit by the first and second control unit, the first and second control units can be configured such that the first function of the motor vehicle can be controlled by means of the first control unit alone and the second function of the motor vehicle by means of the second control unit alone. It is ensured in this way that the first and second motor vehicle functions, which correspond to the first control unit and the faulty third control unit and to the second control unit and the faulty third control unit, can continue to be executed, at least in a manner of an emergency operation.

The same applies to a particularly advantageous refinement of the method of the invention, according to which, depending on the receipt of a fault signal of the third control unit by the first and second control units, the first and second control unit are configured such that the first function of the motor vehicle is controlled by means of the first control unit alone and second function of the motor vehicle by means of the second control unit alone.

The control system can have at least one actuator with an electric motor for executing the first or second function of the motor vehicle, wherein at least one first winding of the electric motor can be driven by means of the first or second control unit and at least one second winding of the electric motor by means of the third control unit, and wherein the second winding of the electric motor is designed such that the second winding can be driven with a second electric power in a faulty operation of the control system, wherein the second electric power is higher than a first electric power with which the second winding can be driven in a normal operation of the control system. This enables the first or second function, to which the actuator with the electric motor corresponds, to be executed with greater effectiveness also in the faulty operation of the control system, in which the first or second control unit does not function properly, than is provided by means of the driving of the electric motor by the third control unit in the normal operation of the control system.

The same applies to a further advantageous refinement of the method of the invention, according to which the control system has at least one actuator with an electric motor for executing the first or second function of the motor vehicle, wherein at least one first winding of the electric motor is driven by means of the first or second control unit and at least one second winding of the electric motor by means of the third control unit, and wherein the second winding of the electric motor is driven with a first electric power in a normal operation of the control system and with a second electric power in a faulty operation of the control system in which the first or second control unit is not functioning properly, wherein the second electric power is higher than the first electric power.

In principle, the first and second function of the motor vehicle can be freely selected within wide suitable limits. A particularly advantageous refinement of the control system of the invention provides, however, that the first function of the motor vehicle is designed as a braking function of the motor vehicle and the second function of the motor vehicle is designed as a steering function of the motor vehicle. These are central and safety-relevant functions of the motor vehicle, the proper execution of which is of vital importance, particularly in highly automated or autonomous motor vehicles.

The same applies to an advantageous refinement of the method of the invention, according to which the first function of the motor vehicle is designed as a braking function of the motor vehicle and the second function of the motor vehicle is designed as a steering function of the motor vehicle.

Highly automated or autonomous motor vehicles are motor vehicles in which the vehicle driver still only performs a certain control task, if at all. Highly automated or autonomous motor vehicles are therefore designed and set up to take part in road traffic essentially independently of the intervention of a vehicle driver. The vehicle driver is more a passenger than a decision maker determining the functions of the motor vehicle.

However, the term "autonomous" is to be interpreted broadly, so that it covers different degrees of autonomous driving and autonomous motor vehicles. For example, situation-dependent autonomous driving and thus situation-dependent autonomous motor vehicles are mentioned here, in which autonomous driving does or does not occur, depending on the traffic situation and/or driving maneuvers to be carried out. Accordingly, one can alternatively speak of automated driving and automated motor vehicles.

A further advantageous refinement of the control system of the invention provides that the third control unit forms a structural unit with the first and/or second control unit. In this way, the compactness of the control system is further improved.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the sole FIGURE shows an exemplary embodiment of a control system of the invention for a motor vehicle.

DETAILED DESCRIPTION

The figure shows by way of example an exemplary embodiment of a control system of the invention for a motor vehicle. The control system has a first control unit 2 for a first function and a second control unit 4 for a second function of a motor vehicle (not shown in more detail). The motor vehicle in this case is designed as an autonomous motor vehicle, in which the functions of the motor vehicle are selected and executed substantially automatically by the motor vehicle.

The first function is designed as a braking function and the second function as a steering function of the motor vehicle. Accordingly, first control unit 2 controls the braking function of the motor vehicle and second control unit 4 the steering function of the motor vehicle. First control unit 2 for controlling the braking function of the motor vehicle is in signal-transmitting connection with first actuators 6 of the motor vehicle designed as brakes, and second control unit 4 is in signal-transmitting connection with a second actuator 8 of the motor vehicle designed as a steering.

The respective signal-transmitting connection between first control unit 2 and brakes 6 and between second control unit 4 and steering 8 is symbolized in the FIGURE by means of solid arrows 2.1 and 4.1. Brakes 6 and steering 8 of the motor vehicle are safety-relevant and therefore very important functions of the motor vehicle. This applies to a greater extent to the selected exemplary embodiment, which is an autonomous motor vehicle.

In order that the braking function and the steering function of the motor vehicle can be executed properly and thus safely even in the event of a fault in one of the control units 2 and 4, the control system for the motor vehicle also has a third control unit 10 in addition to the two control units 2 and 4. Third control unit 10 is, on the one hand, in signal-transmitting connection with the first and second control unit 2 and 4, which is symbolized in FIG. 1 by the solid double arrows 10.1 and 10.2. At the same time, third control unit 10 is also in signal-transmitting connection with brakes 6 and steering 8. This is symbolized by the solid arrows 10.3 and 10.4.

Actuators 6 and 8 each have a six-phase electric motor (which is not shown), wherein three phases are designed as first windings and three other phases as second windings of the respective electric motor. The first windings of first actuators 6 can be driven by means of first control unit 2 and the first windings of second actuator 8 by means of second control unit 4. The second windings of first actuators 6 and the second windings of second actuator 8 can each be driven by means of third control unit 10. The second windings of the electric motors of brakes 6 are designed such that the second windings of these electric motors can be driven with a second electric power in the event of a faulty operation of the control system, therefore, for example, in the case of a faulty first control unit 2, wherein the second electric power is higher than a first electric power with which the second windings of the electric motors of brakes 6 can be driven in a normal operation of the control system.

The method of the invention in the present exemplary embodiment will be explained in more detail below.

In the normal operation of the control system of the invention for the autonomous motor vehicle, brakes 6 are controlled by means of first control unit 2 for the braking function of the motor vehicle and by means of third control unit 10 and steering 8 is controlled by means of second control unit 4 for the steering function of the motor vehicle and by means of third control unit 10. Brakes 6 are thus controlled jointly by means of first control unit 2 and third control unit 10, and steering 8 is controlled jointly by means of second control unit 4 and third control unit 10. For this purpose, in the normal operation of the control system, therefore, for the case when all three control units 2, 4, and 10 are functioning properly, the first windings of the electric motors of brakes 6 are driven by means of first control unit 2 and the second windings of the electric motors of brakes 6 by means of third control unit 10. The same applies analogously to the steering function, in which the first windings of the electric motor of steering 8 are driven by means of second control unit 4 and the second windings of the electric motor of steering 8 by means of third control unit 10.

The need for a braking intervention by first control unit 2 and third control unit 10 or for a steering intervention by second control unit 4 and third control unit 10 is decided in a higher-level control unit in a manner known to the skilled artisan on the basis of input signals applied to the higher-level control unit by the motor vehicle sensors.

By means of signal-transmitting connection 10.1 and 10.2 existing between first control unit 2 and third control unit 10 and between this and second control unit 4, control unit 10 monitors the proper functioning of first control unit 2 and second control unit 4. In addition or alternatively, it would be conceivable that this monitoring of first and second control unit 2, 4 takes place in the above-mentioned higher-level control unit. In the event of a fault in at least one of the two control units 2 and 4, a corresponding fault signal from faulty control unit 2 and/or 4 is applied as an input signal to third control unit 10.

If, for example, first control unit 2 is working incorrectly, so that the braking function of the motor vehicle is no longer executed to the full extent, this error is reported to third control unit 10 by means of signal-transmitting connection 10.1, whereupon third control unit 10 is configured such that it alone controls the braking function of the motor vehicle. For this purpose, third control unit 10 is in signal exchange with brakes 6 of the motor vehicle by means of signal-transmitting connection 10.3. In the event of a fault in first control unit 2, brakes 6 are therefore no longer jointly controlled by first control unit 2 and third control unit 10, but by third control unit 10 alone.

In order to fulfill legal requirements or the like, for example, it is provided in the present exemplary embodiment that the second windings of the electric motors of brakes 6 are driven by a first electric power in a normal operation of the control system and by a second electric power in a faulty operation of the control system, namely, in the case of a faulty first control unit 2, wherein the second electric power is higher than the first electric power. In the present exemplary embodiment, the first windings and second windings of the electric motors of brakes 6 are driven with 50% of the nominal power of the respective electric motor in the normal operation of the control system, so that 100% of the nominal power of the respective electric motor results for brakes 6 in the normal operation. In a faulty operation of the control system, namely, in a faulty first control unit 2, the second windings of the electric motors of brakes 6 are driven at full load, namely, with 70% of the nominal power of the respective electric motor, so that 70% of the nominal power of the respective electric motor results for brakes 6 in the faulty operation.

In the normal operation of the control system of the invention in accordance with the present exemplary embodiment, the second windings of the electric motors of brakes 6 are thus only loaded with a partial load. Only in the faulty operation of the control system explained above are the second windings of the electric motors of brakes 6 loaded with the respective full load. The service life of the second windings of the electric motors of brakes 6 driven by means of third control unit 10 and thus the service life of brakes 6 are increased accordingly.

The same applies if second control unit 4 is working incorrectly. In this case, third control unit 10 receives a corresponding error message regarding second control unit 4 by means of signal-transmitting connection 10.2, whereupon third control unit 10 is configured such that it alone controls the steering function of the motor vehicle. Steering 8 is therefore no longer controlled jointly by faulty second control unit 4 and third control unit 10, but by third control unit 10 alone, namely, by means of signal-transmitting connection 10.4.

The control system of the invention according to the present exemplary embodiment not only ensures the execution of the first function in the case of a faulty first control unit 2 or the execution of the second function in the case of a faulty second control unit 4, at least in an emergency operation of the respective function, but also enables the execution of the first and second function, at least in an emergency operation, with a simultaneously faulty first and faulty second control unit 2, 4.

In the present exemplary embodiment, it is provided moreover that, depending on the receipt of a fault signal of third control unit 10 by first and second control unit 2, 4, first and second control unit 2, 4 can be configured such that the braking function of the motor vehicle can be controlled by means of first control unit 2 alone and the steering function of the motor vehicle by means of second control unit 4 alone. Accordingly, depending on the receipt of a fault signal of third control unit 10 by first and second control unit 2, 4, first and second control unit 2, 4 would be configured such that the braking function of the motor vehicle is controlled by means of first control unit 2 alone and the steering function of the motor vehicle by means of second control unit 4 alone.

In a faulty operation of the control system, namely, when third control unit 10 is not functioning properly, only the first windings of the electric motors of brakes 6 are driven by means of first control unit 2 and the first windings of the electric motor of steering 8 by means of second control unit 4.

The invention is not limited to the present exemplary embodiment. It is conceivable, for example, that the third control unit forms a structural unit with the first and/or second control unit. The compactness of the control system of the invention is improved in this way. This is possible, for example, if the respective control units are arranged close to one another in their installation position, for example, in an engine compartment of the motor vehicle.

In addition, the first and second functions of the motor vehicle are not limited to the braking function and the steering function of the motor vehicle.

When using at least one actuator with an electric motor, the design of the at least one first and the at least one second winding of this electric motor can be freely selected within wide suitable limits according to number, arrangement, shape, dimension, and driving. Accordingly, the design of the individual windings of this electric motor and its driving in a normal operation and faulty operation of a control system of the invention is not limited to the exemplary embodiment explained above.

The invention further relates to a motor vehicle comprising a control system of the invention, to a computer program product comprising commands that cause the control system of the invention, for example, according to the present exemplary embodiment, to execute the method steps of the method of the invention, for example, according to the present exemplary embodiment, and to a computer-readable medium on which the computer program product of the invention is stored.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A control system for a motor vehicle, the control system comprising:
    a first control unit to control a first function of the motor vehicle;
    a second control unit to control a second function of the motor vehicle, the first and second control units being connectable in a signal-transmitting manner to at least one of at least one sensor or at least one actuator for executing a respective function of the motor vehicle; and
    a third control unit to control the first function and the second function of the motor vehicle, the third control unit being connectable in a signal-transmitting manner to the first and second control units and to at least one of the at least one sensor corresponding to the first and second control units or the at least one actuator for executing the respective function of the motor vehicle,
    wherein, depending on a receipt of a fault signal of at least one of the first or second control unit by the third control unit, the third control unit is configured such that at least one of the first or second function of the motor vehicle corresponding to the faulty control unit is controlled by the third control unit alone,
    wherein the control system further comprises at least one actuator with an electric motor for executing the first or second function of the motor vehicle, wherein at least one first winding of the electric motor is drivable by the first or second control unit and at least one second winding of the electric motor is drivable by the third control unit, wherein the at least one second winding of the electric motor is designed such that the at least one second winding is drivable with a second electric power in a faulty operation of the control system, and wherein the second electric power is higher than a first electric power with which the second winding is drivable in a normal operation of the control system.

2. The control system according to claim 1, wherein, depending on a receipt of a fault signal of the third control unit by the first and second control units, the first and second control units are configured such that the first function of the motor vehicle is controlled by the first control unit alone and the second function of the motor vehicle is controlled by the second control unit alone.

3. The control system according to claim 1, wherein the first function of the motor vehicle is a braking function and the second function of the motor vehicle is a steering function.

4. The control system according to claim 1, wherein the third control unit forms a structural unit with at least one of the first or second control unit.

5. A motor vehicle comprising:
    the control system according to claim 1.

6. A method for controlling a motor vehicle, the method comprising:
    providing a first control unit to control a first function of the motor vehicle;
    providing a second control unit to control a second function of the motor vehicle,
    connecting the first and second control units in a signal-transmitting manner to at least one of at least one sensor or at least one actuator for executing a respective function of the motor vehicle;
    providing a third control unit to control the first function and the second function of the motor vehicle; and
    connecting the third control unit in a signal-transmitting manner to the first and second control units and to the at least one sensor corresponding to at least one of the first and second control units or the at least one actuator for executing the respective function of the motor vehicle,
    wherein, depending on a receipt of a fault signal of at least one of the first or the second control unit by the third control unit, the third control unit is configured such that at least one of the first or second function of the motor vehicle corresponding to the faulty control unit is controlled by the third control unit alone,
    wherein the control system has at least one actuator with an electric motor for executing the first or second function of the motor vehicle, wherein at least one first winding of the electric motor is driven by the first or second control unit and at least one second winding of the electric motor is driven by the third control unit, and wherein the at least one second winding of the electric motor is driven with a first electric power in a normal operation of the control system and is driven with a second electric power in a faulty operation of the control system, wherein the second electric power is higher than the first electric power.

7. The method according to claim 6, wherein, depending on a receipt of a fault signal of the third control unit by the first and second control unit, the first and second control units are configured such that the first function of the motor vehicle is controlled by the first control unit alone and the second function of the motor vehicle by the second control unit alone.

8. The method according to claim 6, wherein the first function of the motor vehicle is a braking function and the second function of the motor vehicle is a steering function.

9. A non-transitory computer-readable medium on storing a computer program thereon that, when executed by a computer, causes the computer to carry out the method according to claim 6.

\* \* \* \* \*